United States Patent
Lemoine

(10) Patent No.: US 7,703,006 B2
(45) Date of Patent: Apr. 20, 2010

(54) SYSTEM AND METHOD OF ACCELERATING DOCUMENT PROCESSING

(75) Inventor: Eric T. Lemoine, San Diego, CA (US)

(73) Assignee: LSI Corporation, Milpitas, CA (US)

( * ) Notice: Subject to any disclaimer, the term of this patent is extended or adjusted under 35 U.S.C. 154(b) by 922 days.

(21) Appl. No.: 11/145,262

(22) Filed: Jun. 2, 2005

(65) Prior Publication Data

US 2006/0277459 A1    Dec. 7, 2006

(51) Int. Cl.
G06F 17/00 (2006.01)
(52) U.S. Cl. ...................................................... 715/234
(58) Field of Classification Search ................. 715/200, 715/234, 249
See application file for complete search history.

(56) References Cited

U.S. PATENT DOCUMENTS

| | | | |
|---|---|---|---|
| 5,857,212 A | | 1/1999 | Van De Vanter |
| 6,108,676 A | * | 8/2000 | Nakatsuyama ............... 715/210 |
| 6,128,627 A | * | 10/2000 | Mattis et al. ................. 707/202 |
| 6,289,347 B1 | * | 9/2001 | Giroux ........................... 707/10 |
| 6,324,555 B1 | * | 11/2001 | Sites ............................. 715/234 |
| 6,378,072 B1 | * | 4/2002 | Collins et al. ............... 713/187 |
| 6,470,333 B1 | * | 10/2002 | Baclawski ....................... 707/3 |
| 6,539,373 B1 | * | 3/2003 | Guha ............................... 707/3 |
| 6,772,413 B2 | | 8/2004 | Kuznetsov |
| 6,883,137 B1 | * | 4/2005 | Girardot et al. ............. 715/242 |
| 7,080,314 B1 | * | 7/2006 | Garofalakis et al. ......... 715/236 |
| 7,328,204 B2 | * | 2/2008 | Coady ............................ 707/2 |
| 7,437,664 B2 | * | 10/2008 | Borson ......................... 715/234 |
| 2001/0013047 A1 | | 8/2001 | Marques |
| 2003/0070143 A1 | * | 4/2003 | Maslov ......................... 715/513 |
| 2003/0101416 A1 | * | 5/2003 | McInnes et al. ............. 715/513 |
| 2003/0105950 A1 | * | 6/2003 | Hirano et al. ................ 713/100 |
| 2003/0145278 A1 | * | 7/2003 | Nielsen ........................ 715/511 |
| 2003/0163285 A1 | | 8/2003 | Nakamura et al. |
| 2003/0237047 A1 | * | 12/2003 | Borson ......................... 715/513 |
| 2004/0010752 A1 | | 1/2004 | Chan et al. |
| 2004/0073541 A1 | * | 4/2004 | Lindblad et al. ................ 707/3 |
| 2004/0172234 A1 | | 9/2004 | Dapp et al. |
| 2004/0177325 A1 | * | 9/2004 | Keane et al. ................. 715/530 |
| 2004/0186817 A1 | * | 9/2004 | Thames et al. ................. 707/1 |
| 2004/0194016 A1 | * | 9/2004 | Liggitt ...................... 715/501.1 |
| 2004/0225999 A1 | | 11/2004 | Nuss |
| 2004/0268233 A1 | * | 12/2004 | Okumura et al. ............ 715/513 |
| 2005/0063545 A1 | * | 3/2005 | Fujimoto et al. ............ 380/277 |

(Continued)

OTHER PUBLICATIONS

Amer-Yahia et al., Structure and Content Scoring for XML, ACM 2005, pp. 361-372.*

(Continued)

*Primary Examiner*—Cong-Lac Huynh

(57) ABSTRACT

Embodiments include methods and systems for processing XML documents. One embodiment is a system that includes a tokenizer configured to identify tokens in an XML document. A plurality of speculative processing modules are configured to receive the tokens and to at least partially process the XML document and to provide data indicative of the XML document. A first module is configured to perform further processing of the XML document using the data indicative of the XML document and configured to output the processed XML document. Each of the plurality of speculative processing modules is configured to asynchronously provide the data indicative of the XML document to the first module. Other embodiments include method and systems for performing the speculative processing.

17 Claims, 6 Drawing Sheets

U.S. PATENT DOCUMENTS

| | | | |
|---|---|---|---|
| 2005/0114614 A1* | 5/2005 | Anderson et al. | 711/162 |
| 2005/0273450 A1 | 12/2005 | McMillen et al. | |
| 2005/0283492 A1* | 12/2005 | Schmitt et al. | 707/100 |
| 2006/0004772 A1* | 1/2006 | Hagan et al. | 707/10 |
| 2006/0005122 A1 | 1/2006 | Lemoine | |
| 2006/0005247 A1* | 1/2006 | Zhang et al. | 726/26 |
| 2006/0031315 A1* | 2/2006 | Fenton et al. | 709/206 |
| 2006/0036631 A1* | 2/2006 | Cheslow | 707/101 |
| 2006/0288276 A1* | 12/2006 | Odagiri et al. | 715/513 |
| 2007/0143324 A1* | 6/2007 | Eichhorst | 707/101 |
| 2007/0168327 A1* | 7/2007 | Lindblad et al. | 707/2 |

OTHER PUBLICATIONS

Yan et all, Index Structure for Selective Dissemination of Information under the Boolean Model, IEEE Jun. 1994, pp. 332-364.*

Kanemoto et al., An Efficiently Updatable Index Scheme for Structured Documents, IEEE 1998, pp. 991-996.*

Sperberg-McQueen et al., Goddag: A Data Structure for Overlapping Hierarchies, Google 2004, pp. 139-160.*

Jensen, Fingerprinting Text in Logical Markup Language, Google 2001, pp. 433-445.*

Lenstra et al., On the Possibility of Constructing Meaningful Hash Collisions for Public Keys, Google 2005, pp. 267-279.*

Koloniari et al., Peer-to-Peer Management of XML Data: Issues and Research Challenges, Google Jun. 2005, pp. 6-17.*

Carpentier et al. "Structural Similarity Search in Databases: Yakusa", 2003, 3 pages.

Flesca et al. "Fast Detection of XML Structural Similarity." IEEE Transactions on Knowledge and Data Engineering, vol. 17, No. 2, Feb. 2005, pp. 160-175.

Flesca et al. "Detecting Structural Similarities between XML Documents", in Proceedings of the Int. Workshop on the Web and Databases, WebDB 2002. pp. 1-6.

Guerrini, Giovanna. "Measuring Structural Divergences in XML Documents", First International Workshop Clip 2005, 37 pages.

Nierman et al. "Evaluating Structural Similarity in XML Documents", Proceedings of the Fifth International Workshop on the Web and Databases, WebDB 2002, 6 pages.

Onizuka, Makoto. "Light-Weight XPath Processing of XML Stream with Deterministic Autodata." CIKM'03, Nov. 3-8, 2003: 342-349.

Olteanu, D., et al. "XPath: Looking Forward." Institute for Computer Science and Center for Information and Language Processing, University of Munich, Germany: 1-15.

Grust, Torsten. Accelerating XPath Location Steps.: ACM SIGMOD, Jun. 4-6, 2002: 109-120.

Helmer, Sven, et al. "Optimized Translation of XPath into Algebraic Expressions Parameterized by Programs Containing Navigational Primitives." Proceedings of the 3$^{rd}$ International Conference on the Web Information Systems Engineering, 2002: 1-10.

Manos, Papgelis. Optimized Translation of XPath into Algebraic Expressions Parameterized by Programs Containing Navigational Primitives of Sven Helmer, Carl-Christian Kanne and Guido Moerkotte.: Herkalion, University of Crete, Dec. 2, 2003: 1-32.

Snoeren, Alec C., et al. "Mesh-Based Content Routing using XML." MIT Laboratory of Computer Science: 1-14.

Vion-Dury, Jean Yves. "XPath on Left and Right Sides of Rules: Toward Compact XML Tree Rewriting through Node Patterns." DocEng '03, Nov. 20-22, 2003: 19-25.

Nicola, Matthias, et al. "XML Parsing: A Threat to Database Performance." CIKM'03, Nov. 3-8, 2003: 175-178.

Su, Hong, et al. "Raindrop: A Uniform and Layered Algebraic Framework for XQueries on XML Streams." CIKM'03, Nov. 3-8, 2003: 279-286.

Miklau, Gerome, et al. "Containment and Equivalence for a Fragment of XPath." Journal of the ACM, vol. 51, No. 1, Jan. 2004: 2-45.

Chan, Chee-Yong, et al. Efficient filtering of XML documents with XPath expressions.: The VLDB Journal, 2002, vol. 11: 354-379.

Dechler, Kurt, et al. MASS: A Multi-Axis Storage Structure for Large XML Documents.: CIKM'03, Nov. 3-8, 2003: 520-523.

Suciu, Dan. "Distributed Query Evaluation on Semistructured Data." ACM Transactions on Database Systems, vol. 27, No. 1, Mar. 2002: 1-62.

Murata, Makoto, et al. "XML Access Control Using Static Analysis." CCS '03, Oct. 27-31, 2003: 73-84.

Villard, Lionel, et al. "An Incremental XSLT Transformation Processor for XML Document Manipulation." WWW 2002, May 7-11, 2002: 474-485.

* cited by examiner

SYSTEM AND METHOD OF ACCELERATING DOCUMENT PROCESSING

BACKGROUND OF THE INVENTION

1. Field of the Invention

The invention relates to a system and method for processing structured documents such as extended markup language (XML) documents.

2. Description of the Related Technology

Extensible markup language (XML) is a data description language that provides a mechanism to represent structured data in way that retains the logical structure and interrelationship of the underlying data. In XML, data is represented as Unicode text using standardized markup syntax to express the structural information about that data. In brief, XML syntax includes tags (a string bracketed by '<' and '>') and attributes (syntax of the form attribute_name="value"). The particular tags and attributes used in a document may be selected with reference to the type of data that is represented by a particular document. Moreover, an XML document may be constructed to conform to a document type declaration (DTD). A DTD is a formal description of a particular type of document. It sets forth what elements the particular type of document may contain, the structure of the elements, and the interrelationship of the elements.

While XML is human readable, XML documents, particularly those which conform to a well-known or standardized DTD, provide a convenient means of data exchange between computer programs in general, and on the Internet in particular. However, many of XML's features, as well as the use of text and the structures encoded within the text, make XML document processing processor intensive. Thus, in systems that exchange a high volume of XML data, e.g., e-commerce systems that process XML encoded security data, XML processing may tend to consume so much of a server's processing power that the amount of processing power remaining to actually apply the XML data to the relevant application may be impacted. One solution to this problem is to offload processing of XML queries to dedicated content processors that employ hardware specifically configured to process XML. However, the memory and processor requirements associated with XML processing have limited the cost effective implementation of content processing for XML queries. Thus, simpler, yet resource efficient systems and methods of processing XML documents are needed.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include faster and more efficient processing of XML documents.

One embodiment is system for processing XML documents. The system includes a tokenizer configured to identify tokens in an XML document. The system further includes a plurality of speculative processing modules configured to receive the tokens and to at least partially process the XML document and to generate data indicative of the XML document. The system further includes a first module configured to receive the data indicative of the XML document and configured to perform further processing of the XML document using the data indicative of the XML document and configured to output the processed XML document. Each of the plurality of speculative processing modules is configured to asynchronously provide the data indicative of the XML document to the first module.

Another embodiment includes a method of processing a document having structured data. The method includes determining a first indicator that identifies structure of a first document, determining at least one property of the first document, and storing the first indicator with the at least one property. In one embodiment, the method further includes determining a second indicator that identifies structure of a second document, matching the second indicator to the first indicator, and retrieving the at least one property stored with the first indicator.

Another embodiment is a content processor containing software defining a process which when executed causes the content processor to perform the acts of: determining a first indicator that identifies structure of a first document having structured data, determining at least one property of the first document; and storing the first indicator with the at least one property.

Another embodiment is a method of searching in structured documents. The method includes storing a plurality of isomorphic digest values in a data structure that associates each of the plurality of isomorphic digest values with data indicative of at least a portion of a respective hierarchical structure. The method further includes identifying a portion of an XML document. Said portion may comprise a hierarchical structure. The method further includes determining an isomorphic digest indicative of the portion. The method further includes identifying the isomorphic digest value with a stored one of the plurality of isomorphic digest values. The method further includes outputting the associated data indicative of the at least a portion of a respective hierarchical structure.

Another embodiment is a method of transforming an XML document into a predetermined format. The method includes identifying at least a portion of the XML document that is noncompliant with the predetermined format. The method further includes transforming the portion of the XML document into compliance with the predetermined format using the one of the plurality of transformations and outputting the transformed portion of the XML document when the portion of the XML document can be transformed into compliance using at least one of plurality of transformations. When the portion of the XML document cannot be transformed into compliance using at least one of plurality of transformations, the method further includes outputting data indicative of the portion of the XML document.

Another embodiment is a system for transforming an XML document into a predetermined format. The system includes means for identifying a portion of the XML document that is noncompliant with the predetermined format, means for transforming the portion of the XML document into the predetermined format using at least one one of the plurality of transformations and providing the transformed portion when the XML document can be transformed into compliance using the at least one of plurality of a transformation, and means for outputting data indicative of the portion of the XML document when the XML document cannot be transformed into compliance using at least one of plurality of transformations.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Processing of XML documents is typically performed as set of sequential steps. The steps used in that sequence to process a particular document may vary with the content of the XML document. For example, after receiving an XML document, a system may first identify the type of document. For a particular type of document, data in a certain element of the XML document may be desired. Thus, the document may be more fully processed to, for example, resolve namespaces in the document to properly identify the desired data element.

One way of improving processing performance is by using customized hardware to perform part of the XML processing. For example, overall throughput of an XML document processing system, in general, and applicability of hardware acceleration for such processing, in particular, can be improved by speculatively performing certain functions of processing XML documents in parallel upon receipt of such documents for processing. As such documents are further processed, the data derived by the speculatively processed functions is available without delay for continued processing by other XML processing functions.

Moreover, XML documents in many applications are computer generated. Computer generated XML documents tend to have a very consistent structure from document to document, even though the actual data content itself varies. For example, XML documents that describe an "employee," e.g., produced to comply with a DTD that includes an "employee," may be structurally identical, e.g., providing the same elements of each employee with the same structure and with the same order within the structure, with only the actual attribute values of each document varying. More generally, most XML documents received by a system for processing are in fact well formed, valid, designed against an available schema, in canonical XML form, and include namespaces that are known in advance. Thus, the overall processing performance of XML documents can be simplified and thus accelerated by assuming that documents are in such regular forms until data in the document shows otherwise. In particular, such documents can be processed more efficiently by identifying documents that share the structure of a previously processed document so that data structures or other data associated with the prior processing of structural data can be reused.

Figure 1:
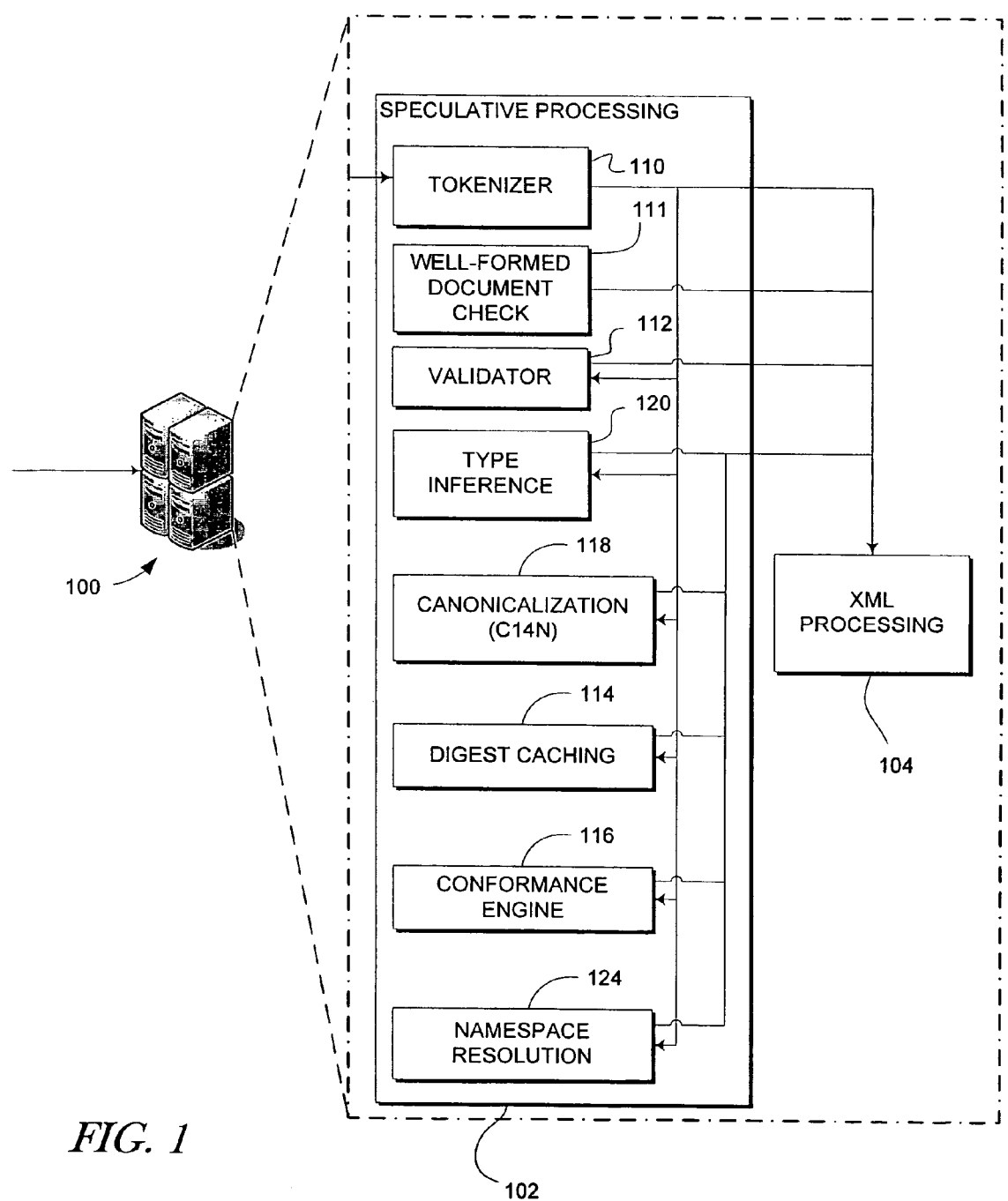
FIG. 1 is a block diagram illustrating an exemplary system for processing XML documents.

FIG. 1 is a block diagram illustrating an exemplary system 100 for processing XML documents. In one embodiment, the system 100 includes one or more processors in communication with memory and storage. The system 100 includes speculative processing modules 102 that process functions of an XML document received by the system 100 and provide data regarding those functions to an XML processing module 104. In one embodiment, one or more of the speculative processing modules 102 execute in parallel. In one embodiment, the system 100 includes one or more general purpose processors and one or more content processors configured to execute software instructions for performing at least some of the functions attributed to the system 100. In one embodiment, the content processors may include general purpose microprocessors or other digital logic circuits, e.g., a programmable gate array (PGA) or an application specific integrated circuit (ASIC) configured to perform at least some of the functions attributed to the system 100. In one embodiment, the speculative processing modules 102 are executed in parallel on or more of the general purpose processors and/or the content processors. The speculative processing modules 102 perform particular functions in the processing of XML documents that may or may not be needed for any given document and provide that data asynchronously, e.g., without the data being requested, to the XML processing module 104 for further processing. However, by performing portions of the processing in parallel and asynchronously, overall processing time, e.g., system latency, of XML documents can be decreased as compared to serial processing where particular functions of processing are performed only as needed. Moreover, by selecting suitable functions to perform speculatively, such functions can be implemented in hardware to further improve performance.

In one embodiment, the speculative processing modules 102 include one or more of a tokenizer 110 that processes XML documents into syntactic tokens, a well-formed document check module 111 that at least partially determines whether the XML document is well formed according to the XML specification, and a validator 112 that at least partially determines whether the XML document is valid. In one embodiment, the tokenizer 110 may include hardware for performing tokenization such as described in U.S. patent application Ser. No. 10/831,956 entitled "SYSTEM AND METHOD OF TOKENIZING DOCUMENTS," filed Apr. 26, 2004, and incorporated by reference in its entirety. In addition, U.S. patent application Ser. No. 10/774,663, filed Jul. 2, 2004, which is hereby incorporated by reference in its entirety, describes one embodiment of the validator 112 that identifies documents that are not well-formed by using statistics obtained by, for example, the tokenizer 110.

In one embodiment, the speculative processing modules 102 include a digest hashing module 114 that maintains a cache of data associated with XML documents having particular structures. The speculative processing modules 102 may also include a conformance engine 116 that determines whether a document conforms to a particular structure, and identifies data in the document that does so conform.

The speculative processing modules 102 may also include a type inference module 120 that infers the types of attributes of processed XML documents. In one embodiment, the speculative processing modules 102 include a canonicalization (C14N) module 118 that determines and whether an XML document is in a particular "canonical" form, such as the canonical XML form defined by the World Wide Web Consortium (W3C). The speculative processing modules 102 may also include a namespace resolution module 124 that resolves names within the XML document structure according to the proper namespace.

In operation, an XML document is received by the system 100 for processing. Each of the speculative processing modules 102 processes the incoming XML document. In one embodiment, each of the speculative processing modules 102 processes the XML document concurrently or in parallel using multiple processors and/or digital logic circuits. The results of the speculative processing are provided to the XML processing module 104 for further processing. As the XML processing module 104 proceeds with processing, processed data provided by the speculative processing modules 102 is available to the XML processing module 104 without further processing delay. For example, the XML processing module 104 can obtain data already located in the document by the conformance engine 116.

In one embodiment, the digest caching module 114 is configured to calculate a hash or digest value that identifies the structure of an XML document. The digest value is then stored in a data cache so as to identify cached data associated with the structure or other properties of the document. In one embodiment, the cache is a hashtable that identifies the cached data with the respective digest value. The cached document properties may include data or data structures derived by processing the XML document. When a second XML document is received having the same structure, and thus the same digest value as the first XML document in the cache, the cached data may be used to process the second document without requiring additional processing time to derive the cached data.

Figure 2:
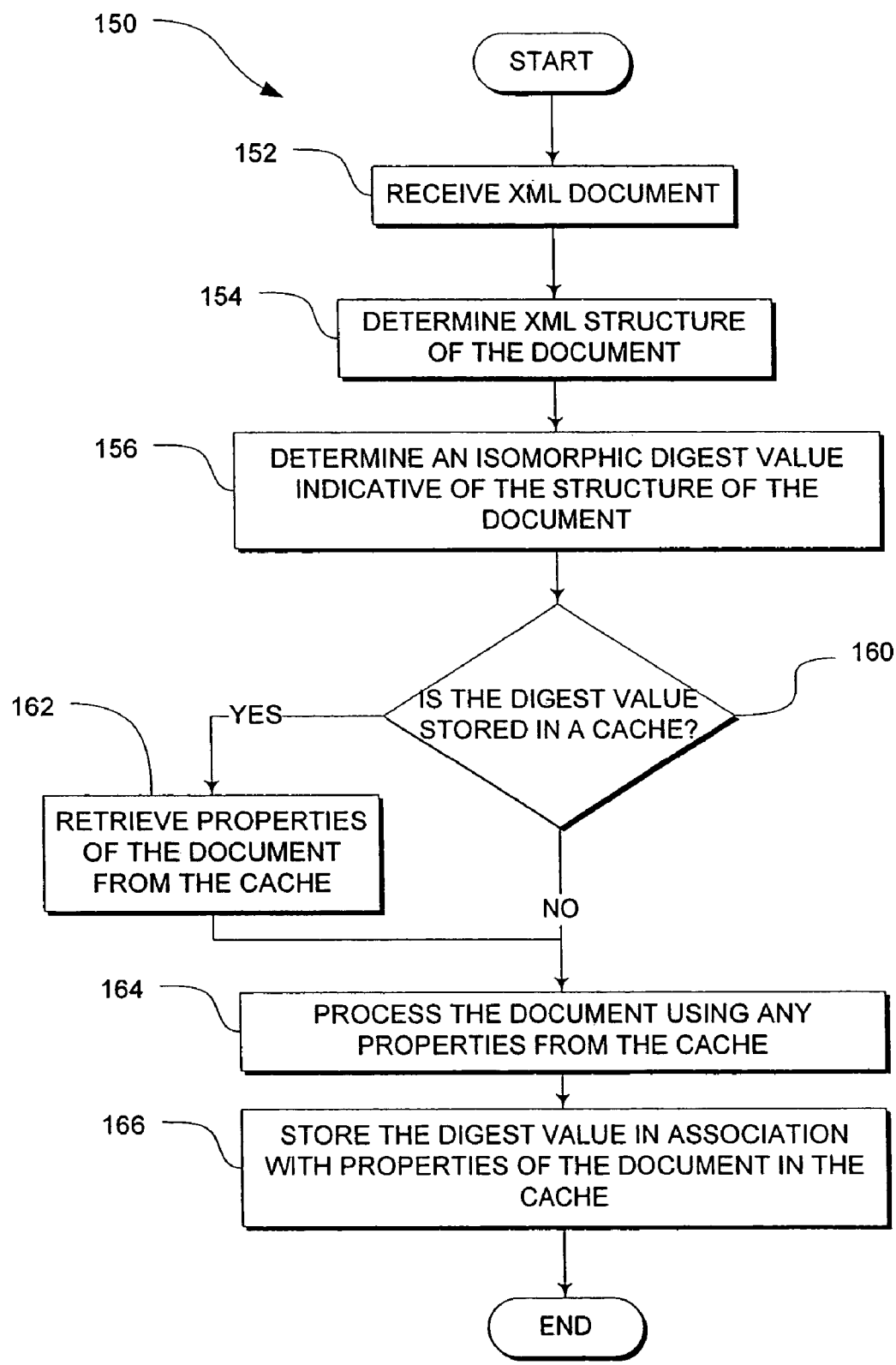
FIG. 2 is a flowchart illustrating an exemplary method of using a system such as illustrated in FIG. 1 to identify and cache documents having substantially similar structures.

FIG. 2 is a flowchart illustrating an exemplary method 150 of using the system 100 to identify and cache documents having substantially similar structures. In one embodiment, data obtained during processing of a first document is cached for later use while processing later received documents that have substantially the same XML structure. The method 150 begins at a block 152 in which the system 100 receives an XML document. Next at a block 154, the system 100 processes the XML document, e.g., performs initial tokenization and parsing, to determine the structure of the document. Moving to a block 156, the digest caching module determines an isomorphic digest value indicative of the structure of the XML document. Two XML documents may be referred to as being isomorphic if the documents have the same structure. A digest value refers to a representation of the document in the form of a short string or numeric value such as calculated by a one-way or hash function. Generally, the effectiveness of a hash table used to cache data may be limited by the effectiveness of the hash function for uniquely identifying the data being hashed. In one embodiment, a cryptographic hash function, e.g., SHA-1, is used to calculate the digest value for each document. By using such a hash function, there is no reasonable likelihood that two different structures hash to the same value.

An isomorphic digest value is thus a digest value that when calculated for two documents is the same if those two documents have the same structure and different if the two documents have different structure. In one embodiment, the digest value for each document is calculated using a string that represents the structure of the document. In one embodiment, the string is determined from the document by removing all whitespace, comments, attribute values, and node text values.

Additional symbols may be placed within the string to disambiguate elements from attributes. Namespace declarations may include the Uniform Resource Identifier (URI) of the namespace. See Table 1 for an example document and structure string.

TABLE 1

| | |
|---|---|
| Document | <doc><br>    <e1><br>        <e5></e5><br>    </e1><br>    <e2></e2><br>    <e3 attr1="attr1value"></e3><br>    <e4 attr1="attr1value"></e4><br></doc> |
| Structure | <doc><e1><e5></e1><e2><e3#attr1><e4#attr2></doc> |

Proceeding to a block 160, the digest caching module 114 looks up the digest value of the current document in the cache to determine whether its digest value is stored in the cache. In one embodiment, the cache includes a hashtable that uses digest values as hash keys for identifying cached data. If cached data is identified with the digest value of the current document, the method 150 proceeds to a block 162 in which the cached data, or a pointer to the cached data, is retrieved and provided to other components of the system 100 for use in processing the current XML document. Next at a block 164, the system 100 processes the current XML document, using the cached data. Referring again to the block 160, if no cache data is identified with the digest value, the method 150 proceeds to the block 164, in which the current XML document is processed without benefit of any cached data. Next at a block 166, the digest caching module 114 stores suitable data obtained in processing the document 164 in the cache and identifies that data with the digest value. In one embodiment, the hash table stores a pointer to the data at the entry in the hash table for the digest value in order to identify the data with the digest value.

Figure 3:
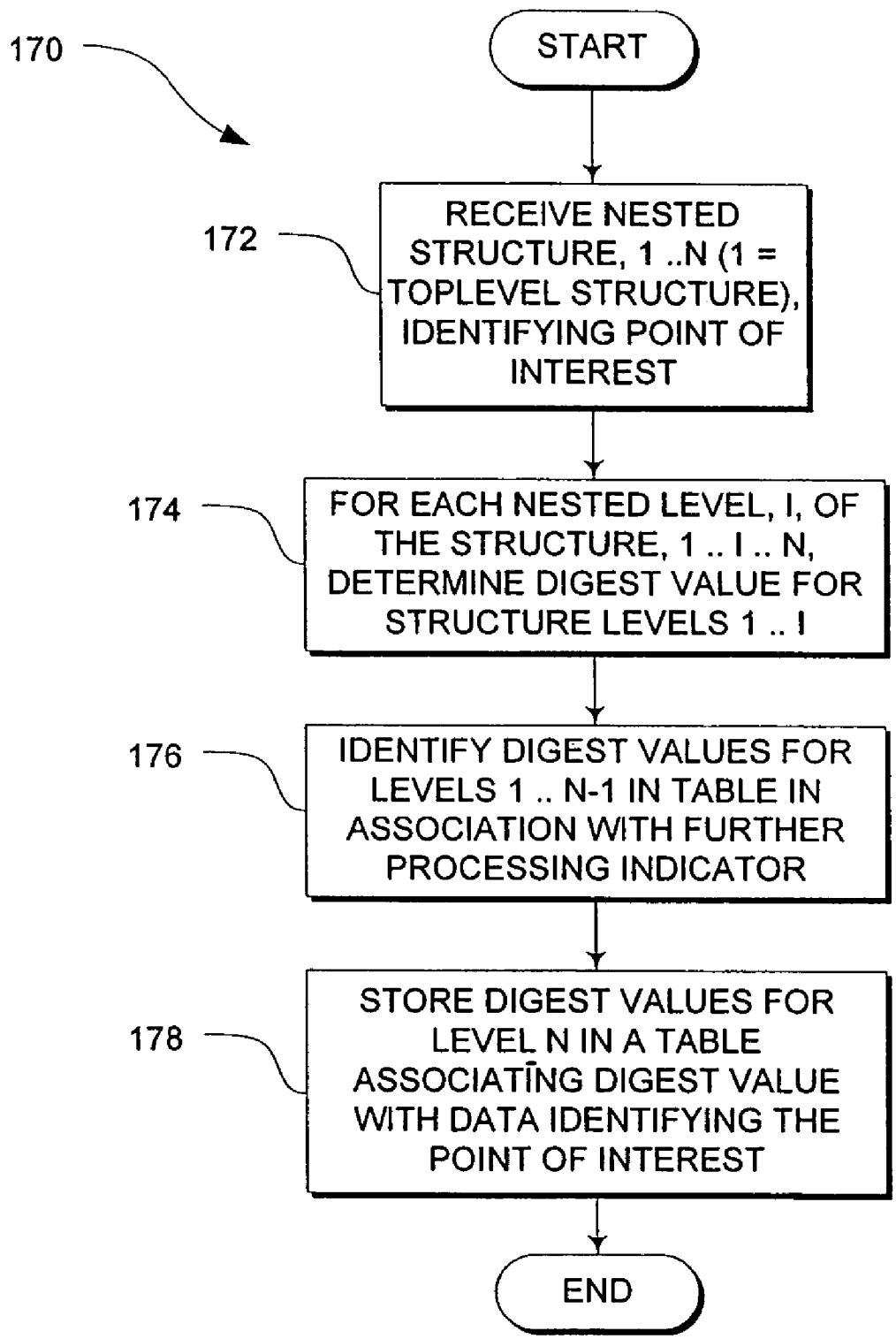
FIG. 3 is a flowchart illustrating an exemplary method of using a system such as illustrated in FIG. 1 to define points of interest in XML documents.

FIG. 3 is a flowchart illustrating an exemplary method 170 of using the system 100 to define points of interest in XML documents. In particular, in one embodiment, the conformance engine 116 is configured to identify points of interest in the structure of an XML document, e.g., to determine whether the document conforms to a particular form. The conformance engine 116 thus searches in parallel for all identified points of interest that may be in the document as the document is processed. In one embodiment, the conformance engine 116 maintains a data structure, embodied as a conformance table, for identifying particular XML document structures that have been defined by, e.g., a user of the system 100, as a point of interest. In one embodiment, the conformance table is a hash table. In one embodiment, the structure of each point of interest is stored in the hash table according to its digest value. In addition, in order to facilitate processing of the structure of the document in a top down fashion as each level of structure is encountered, each structure above the point of interest in the hierarchy of the document's structure is also stored in the conformance table. For example, returning to the example in Table 1, the structure of a particular example document can be represented as a string:

"<doc><e1><e5></e1><e2><e3#attr1><e4#attr2></doc>."

If the "e5" element represents a point of interest, then hash values for each of the structures that are above "e5" in the hierarchical document structure, i.e., its "parent" structures, of "<doc>," and "<doc><e1>" along with the structure of the point of interest, "<doc><e1><e5>" are stored in the table along with corresponding data. In one embodiment, the corresponding data for parent structures "<doc>" and "<doc><e1>" may include a "further processing" token. The corresponding data for the actual point of interest structure, "<doc><e1><e5>," may include a particular token identifying the point of interest, e.g., a numeric code that, for example, indexes a table containing other data relating to a defined group of points of interest. In one embodiment, the corresponding data includes a pointer to a data structure containing further information about the point of interest. In another embodiment, the corresponding data may include a pointer to instructions that are executed upon identifying the point of interest.

The method 170 of generating the entries for a particular point of interest in the conformance table begins at a block 172 in which the conformance engine 116 receives a nested structure identifying a point of interest. For convenience of description, the levels of nested structure may be referred to by a number from 1 to N, with the level 1 being associated with the top most level of the structure and level N being associated with the most deeply nested level of structure. For example, using the example document of Table 1 and the example point of interest at "<doc><e1><e5>", the "<doc>" level may be identified as level 1, the "<e1>" entity as level 2 and the "<e5>" entity as level 3, with N=3.

Next at a block 174, the conformance engine 116 determines a digest value for each level of the structure. In one embodiment, the conformance engine 116 calculates a hash value for the string indicative of each level of structure. For example, a hash value may be calculated for "<doc><e1><e5>" at level N=3, the "<doc><e1>" at level 2 and "<doc>" at level 1. In one embodiment, the hash value is calculated using a cryptographic hash function such as SHA-1.

Proceeding to a block 176, the conformance engine 116 identifies the digest values for each of the structure levels, except for the full structure, N, with a "further processing" indicator or token. In one embodiment, the conformance engine 116 identifies the digest values with the structure levels by storing the further processing token in a hash table using the digest value as the hash key. For example, continuing with the example of Table 1, the hash table may include entries associating the structure strings "<doc>" and "<doc><e1>" with the "further processing" token.

Next at a block 178, the conformance engine 116 determines the digest value of the full structure of the point of interest, e.g., structure level N, with data for processing the point of interest. In one embodiment, the conformance engine 116 stores the data in a hash table using the digest value of the structure string as the hash key. In one embodiment, the data for processing the point of interest includes data identifying the point of interest, such as a token or numeric reference indicator associated with the point of interest. In another embodiment, the conformance engine stores in the conformance table one or more pointers to data associated with the point of interest. In one embodiment, the pointers may include a pointer to executable instructions for processing the point of interest. For example, the conformance engine 116 calculates the hash key for the string "<doc><e1><e5>" and stores a pointer in the hash table to data obtained in the processing of the exemplary document.

Figure 4:
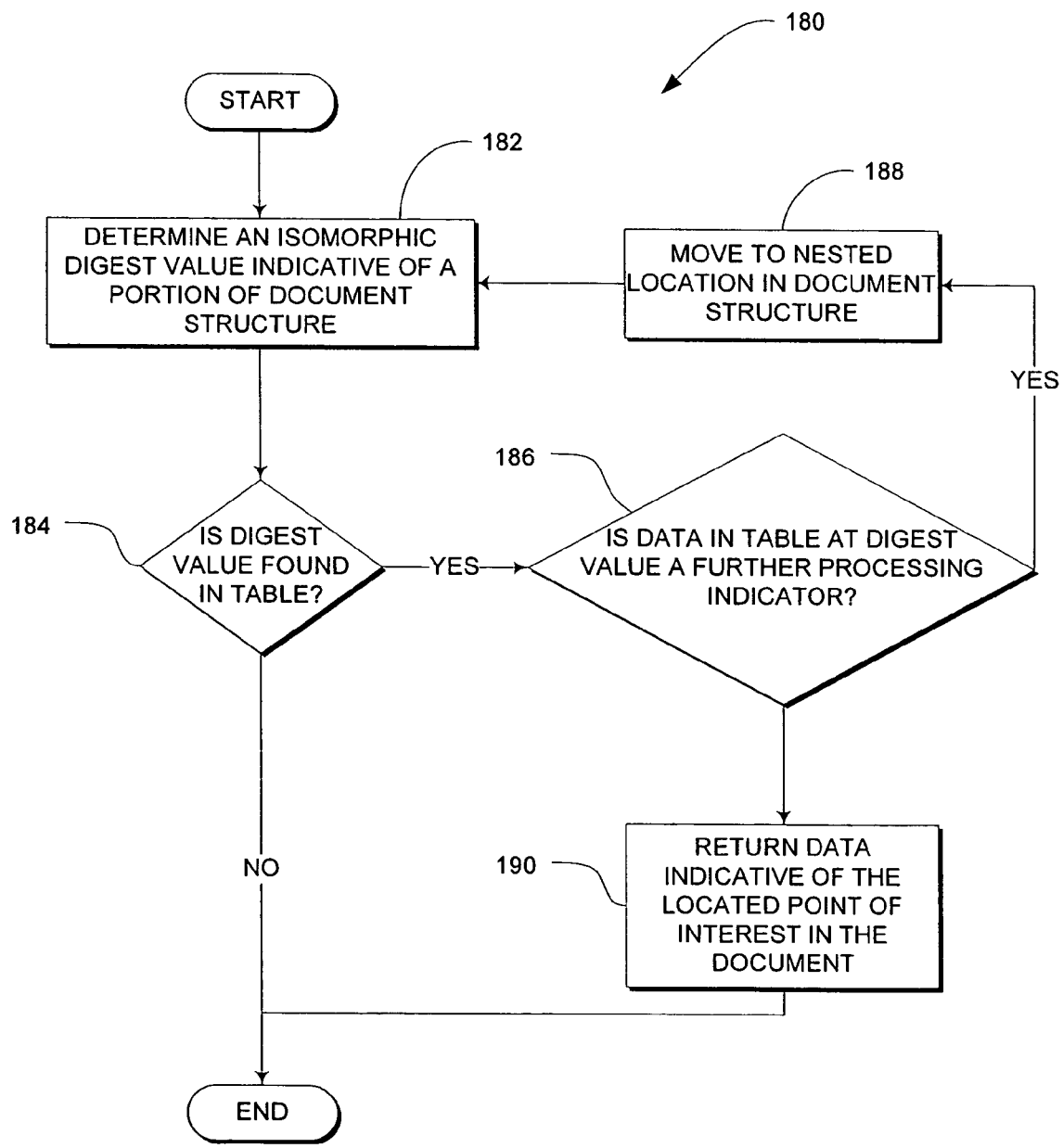
FIG. 4 is a flowchart illustrating an exemplary method of identifying points of interest, such as defined by the method of FIG. 3, in a XML document.

FIG. 4 is a flowchart illustrating an exemplary method 180 of identifying points of interest, such as defined by the method 170, in a XML document that is being processed. Beginning at a block 182, the conformance engine 116 receives a portion of the document structure, e.g., the top level structure in an XML document. The conformance engine 116 determines an isomorphic digest value indicative of the portion of the document structure. In one embodiment, the digest value is a calculated using a hash function, e.g., a cryptographic hash such as SHA-1. For example, after receiving the "<doc>" top-level element of a document, the conformance engine 116 calculates a hash value for the structure string "<doc>" associated with this substructure. Next at block 184, the conformance engine 116 determines whether the hash key for the current portion of the structure has been stored. Continuing with the example from Table 1, as discussed with reference to FIG. 3, the conformance engine 116 retrieves a "further processing" token from the hash table for the hash key of the string "<doc>". If the conformance engine 116 identifies any data, e.g., finds the data in the hash table, with the digest value of the current portion of the structure, the method 180 proceeds to a block 186. If, in the block 184, the conformance engine 116 fails to identifies any data, e.g., the digest value is not in the hash table, the method 180 proceeds to an end state and the conformance engine finishes processing of the portion of the structure.

Moving to the block 186, the conformance engine 116 determines whether the data identified with the digest value denotes further processing, for example, whether the data includes the "further processing" token. If further processing is indicated, the method 180 proceeds to a block 188. If no further processing is indicated, the method 180 proceeds to a block 190. Returning to the block 188, the conformance engine 116 receives data regarding further structure of the document, e.g., the next deeper level of nested structure ("<doc><e1>" in the example of Table 1). In one embodiment, the conformance engine 116 receives one or more tokens until the next level of structure of the current XML document is defined. Next, the method 180 proceeds back to the block 182 to process this next level of structure.

Returning to the block 190, as no further processing is indicated, the conformance engine 116 returns data indicative of the located point of interest in the document. In one embodiment, the data includes a token associated with the point of interest in the document. The conformance engine 116 outputs the token indicating the presence of the particular point of interest to the XML processing module 104. In another embodiment, the data includes a pointer to executable instructions for processing the point of interest. In one embodiment, the conformance engine 116 executes these instructions. In another embodiment, the conformance engine 116 provides the pointer to the executable instruction to the XML processing module 104 for execution.

Generally, it is possible for XML documents which are equivalent for the purposes of many applications to differ in physical representation. For example, such XML documents may differ in their entity structure, attribute ordering, and character encoding. W3C canonicalization (C14N) of XML includes generating a form for an XML document in which certain differences in representation have been removed, for example, converting empty elements to start-end tag pairs, normalizing whitespace outside of document elements and within start and end tags, setting attribute value delimiters to quotation marks (double quotes), adding default attributes to each element, and imposing lexicographic order on the namespace declarations and attributes of each element within the output XML document. The content of two or more documents in canonical XML form can be more easily compared to each other than can documents not in canonical form in order to determine when such documents include equivalent content. Because such documents do not include all possible syntactic constructions in XML, such documents can also be easier to process. One canonical XML format is defined by the World Wide Web Consortium, e.g., "Canonical XML, Version 1.0 (Mar. 15, 2001) available at www.w3c.org. Methods for fully performing C14N processing may be performed in hardware using an ASIC or a gate array. Such a hardware solution may not be cost effective due to the complexity of full C14N processing. However, by performing only selected portions of the C14N processing in hardware logic, C14N processing can be substantially accelerated.

Figure 5:
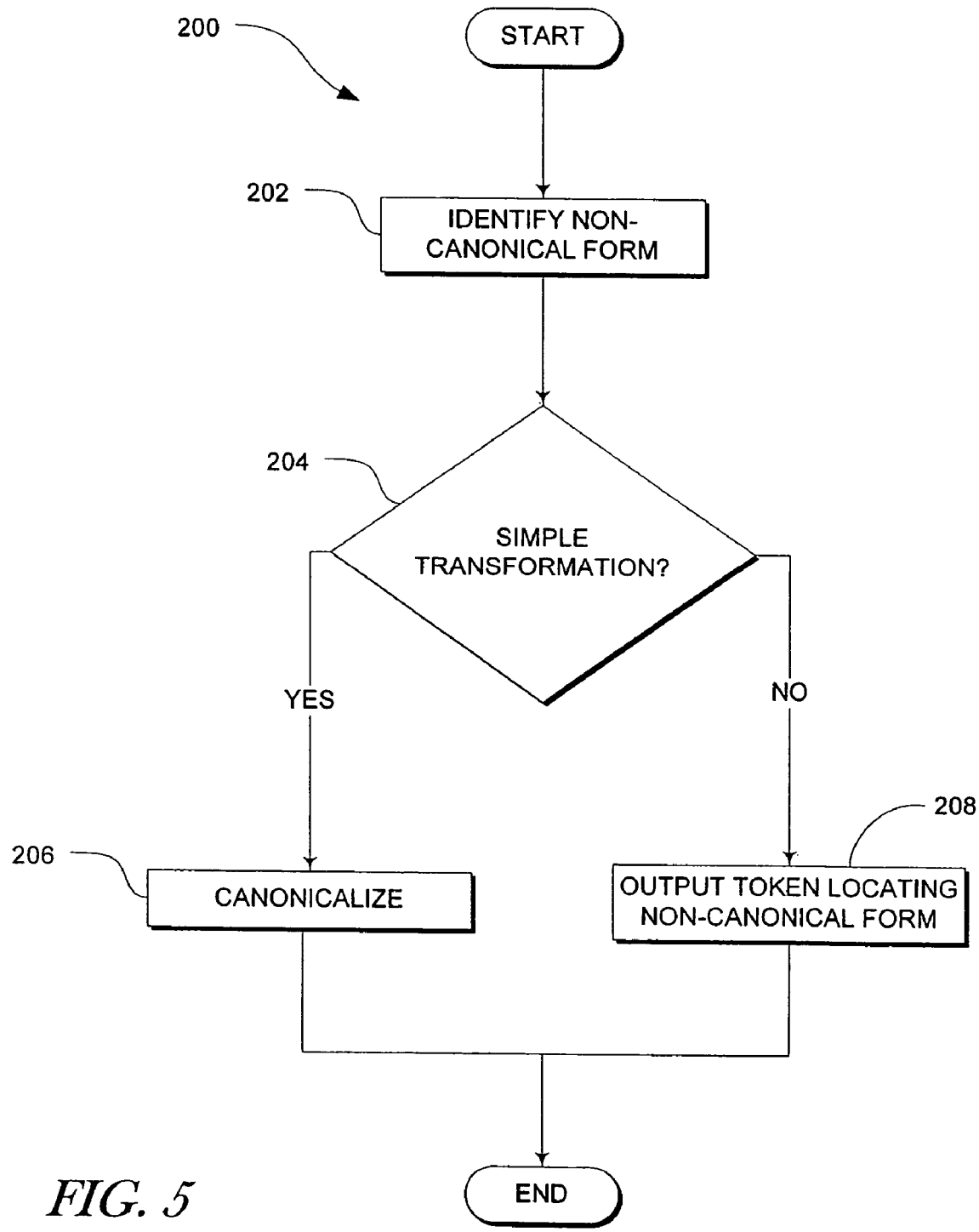
FIG. 5 is a flowchart illustrating an exemplary method of canonicalization processing of an XML document in a system such as illustrated in FIG. 1.

FIG. 5 is a flowchart illustrating an exemplary method 200 of canonicalization processing of an XML document by, for example, the canonicalization module (C14N module) 118. In operation, the C14N module 118 receives each token in the XML document from the tokenizer 110 and processes the token according to the method 200. In one embodiment, the C14N module 118 includes a processor programmed to perform at least a portion of the method 200. In one embodiment, the C14N module includes hardware logic configured to perform at least a portion of the method 200.

The method 200 begins at a block 202 in which the C14N module 118 identifies, based on one or more recent tokens, that the document is not in C14N form. Moving to a block 204, the C14N module 118 determines whether the non-C14N form can be corrected by one of a set of simple transformations. Such simple transformations include extra whitespace in the document. In one embodiment, the simple transformations include transformations of the document that can be performed efficiently by hardware logic such as in a PGA. If the transformation is a simple transformation, the method 180 proceeds to block 206 in which the C14N module 118 performs the simple transformation. Such simple transformations may include discarding extra whitespace (white space in excess of that defined for canonical form) in the document or encoding special characters. If the transformation is not a simple transformation, the method 180 proceeds to a block 208. At the block 208, the C14N module outputs a token noting the presence, location, and other details of the non-canonical form. For example, transformations such as changing the order of elements to be in canonical lexicographic ordering may be performed in software after the entire document is processed. In one embodiment, the C14N module 118 includes software for performing such non-simple transformations. In one embodiment, the C14N module 118 performs only the simple transformations, in hardware logic, during the initial speculative processing of the document. In one such embodiment, the C14N module 118 processes the outputted tokens to more fully place the document in C14N form after the speculative processing phase.

The system 100 may speculatively perform any number of XML processing functions depending on the amount of system resources that are available and the particular application. One such function may include making type inferences using the type inference module 120. In one embodiment, the type inference module 120 evaluates each attribute of each element in an XML document and returns a list of possible types for each token. For example, for an attribute value containing "1" the possible types may include boolean (with a value corresponding to "true") and integer (with a value corresponding to the number 1). In one embodiment, this processing is performed speculatively, e.g., before the need for such data is identified for a particular document, and in hardware logic. Later processing of the XML document can thus be accelerated by having attribute data at least partially processed. For example, because the data of each attribute is processed for each possible type, another component of the system 100 can quickly and efficiently bind the values to a strongly typed (e.g., C or C++) data structure.

Another such function that may be speculatively processed is XML namespace processing. In one embodiment, the namespace resolution module 124 performs namespace resolution of names in the XML document speculatively, e.g., before the need for such data is identified for a particular document, and in hardware logic, so as to reduce the overall time to process each document.

Figure 6:
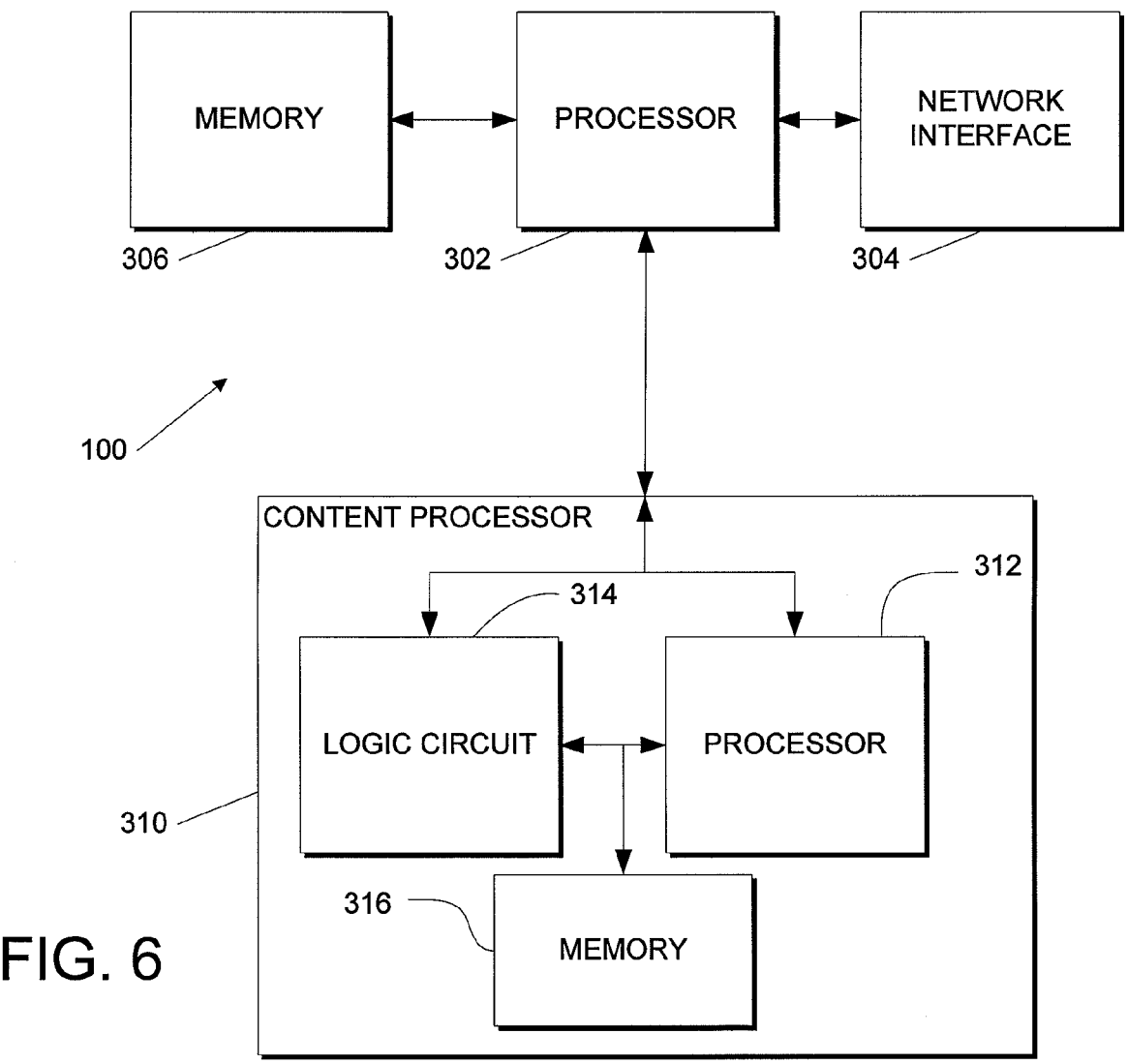
FIG. 6 is a block diagram illustrating in more detail one embodiment of the system of FIG. 1.

FIG. 6 is a block diagram illustrating one embodiment of the system 100. The exemplary system 100 includes a processor 302 operably connected to a network interface 304 and a memory 306. In the exemplary system 100, the processor 302 is also connected to a content processor 310. In one embodiment, the content processor 310 includes a processor 312. In one embodiment, the content processor 310 includes a logic circuit 314. The content processor 310 may also include a memory 316. In one embodiment, the content processor 310 is embodied as an ASIC or a PGA.

In view of the above, one will appreciate that embodiments of the invention overcome many of the longstanding problems in the art by simplifying XML processing so that such processing can be further accelerated using hardware. In particular, numerous XML processing functions can be performed in parallel in hardware in advance so that data from these functions is nearly instantly available to later processing functions. Overall XML processing system throughput and latency can thus be improved.

It is to be recognized that each of the modules described above may include various sub-routines, procedures, definitional statements and macros. Each of the modules may be separately compiled and linked into a single executable program. The description of each of the modules is used for convenience to describe the functionality of one embodiment of a system. Thus, the processes that are performed by each of the modules may be redistributed to one of the other modules, combined together in a single module, or made available in, for example, a shareable dynamic link library. In some embodiments, the modules may be executed concurrently or in parallel as distinct threads or processes. The modules may be produced using any computer language or environment, including general-purpose languages such as C, Java, C++, or FORTRAN. Moreover, the functions described with respect to the modules may be performed, in all or in part, by either the general purpose processor 302 or the content processor 310 of FIG. 6.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A system for processing XML documents, the system comprising:
   a tokenizer configured to identify tokens in an XML document;
   a plurality of speculative processing modules configured to receive said tokens and to at least partially process said XML document and to generate data indicative of said XML document, wherein the plurality of processing modules comprises a plurality of circuits, each of the speculative processing modules corresponding to a respective one of the circuits; and a first module configured to receive said data indicative of said XML document and configured to perform further processing of said XML document using said data indicative of said XML document and configured to output said processed XML document, wherein the first module comprises a circuit configured to receive data from each of the plurality of speculative processing modules, wherein each of the plurality of speculative processing modules is configured to asynchronously provide the data indicative of said XML document to said first module, and wherein each speculative processing module is adapted to process each XML document defined by a first portion related to a data structure and a second portion related to data excluded from the data structure, the data indicative of a corresponding XML document associated with a hash key derived from the data structure.

2. The system of claim 1, wherein at least one of the plurality of speculative processing modules comprises a digest caching module.

3. The system of claim 1, wherein at least one of the plurality of speculative processing modules comprising a conformance engine module.

4. The system of claim 1, wherein at least one of the plurality of speculative processing modules comprises a canonicalization module.

5. A method of processing documents having structured data, said method comprising:

receiving a first document, wherein a first portion of the first document defines a structure of the first document and wherein a second portion of the first document comprises first document data defined at least partly by said first document structure;

generating a first data structure comprising said first document structure defined by said first portion of the first document, wherein said first data structure excludes said second portion of the first document;

determining a first hash key based on said first data structure that identifies said first document structure;

determining at least one property of said first document;

storing said first hash key with said at least one property of said first document;

receiving a second document, wherein a first portion of the second document defines a structure of the second document and a second portion of the second document comprises second data defined at least partly by said second document structure, wherein a hierarchical structure of the second document defined by the second document structure is substantially the same as a hierarchical structure of said first document defined by the first document structure and wherein said first document data is at least partially different from said second document data;

generating a second data structure comprising said second document structure defined by said first portion of the second document, wherein said second data structure excludes said second portion of the second document;

determining a second hash key based on said second data structure that identifies said second document structure;

matching said second hash key to said first hash key; and retrieving said at least one property stored with said first hash key for use in processing the second document.

6. The method of claim 5, wherein said second document comprises an XML document.

7. The method of claim 5, wherein said first document comprises an XML document.

8. The method of claim 5, wherein generating said hash key comprises generating a cryptographic hash.

9. The method of claim 8, wherein said cryptographic hash comprises a SHA-1 algorithm.

10. The method of claim 5, wherein storing said first hash key comprises maintaining a cache.

11. A content processor containing software defining a process which when executed causes the content processor to perform the steps of:

receiving a first document, wherein a first portion of the first document defines a structure of the first document and wherein a second portion of the first document comprises first document data defined at least partly by said first document structure;

generating a first data structure comprising said first document structure defined by said first portion of the first document, wherein said first data structure excludes said second portion of the first document;

determining a first hash key based on said first data structure that identifies said first document structure;

determining at least one property of said first document;

storing said first hash key with said at least one property of said first document;

receiving a second document, wherein a first portion of the second document defines a structure of the second document and a second portion of the second document comprises second data defined at least partly by said second document structure, wherein a hierarchical structure of the second document defined by the second document structure is substantially the same as a hierarchical structure of said first document defined by the first document structure and wherein said first document data is at least partially different from said second document data;

generating a second data structure comprising said second document structure defined by said first portion of the second document, wherein said second data structure excludes said second portion of the second document;

determining a second hash key based on said second data structure that identifies said second document structure;

matching said second hash key to said first hash key; and retrieving said at least one property stored with said first hash key for use in processing the second document.

12. The content processor of claim 11, wherein storing said first hash key comprises maintaining a cache.

13. The content processor of claim 12, comprising a computer readable storage medium configured to store said software and a processor configured to execute said software.

14. The content processor claim 11, further comprising a programmable gate array configured to execute the software.

15. The content processor of claim 11, wherein determining said first and second hash keys is performed by generating a cryptographic hash.

16. The content processor of claim 11, wherein the first and second documents comprise XML documents.

17. The content processor of claim 11, wherein the content processor comprises one or more of an application specific integrated circuit and a network interface card.

* * * * *